(12) United States Patent
Muraoka et al.

(10) Patent No.: US 10,056,606 B2
(45) Date of Patent: Aug. 21, 2018

(54) NEGATIVE ELECTRODE FOR NONAQUEOUS ELECTROLYTE SECONDARY BATTERY AND NONAQUEOUS ELECTROLYTE SECONDARY BATTERY

(71) Applicant: SANYO Electric Co., Ltd., Daito-shi, Osaka (JP)

(72) Inventors: Yoshiyuki Muraoka, Tokushima (JP); Kei Kobayashi, Osaka (JP); Tatsuki Hiraoka, Hyogo (JP); Masahiro Shiraga, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 425 days.

(21) Appl. No.: 14/763,965

(22) PCT Filed: Feb. 10, 2014

(86) PCT No.: PCT/JP2014/000692
§ 371 (c)(1),
(2) Date: Jul. 28, 2015

(87) PCT Pub. No.: WO2014/132579
PCT Pub. Date: Sep. 4, 2014

(65) Prior Publication Data
US 2015/0372306 A1 Dec. 24, 2015

(30) Foreign Application Priority Data

Feb. 26, 2013 (JP) .................................. 2013-035948

(51) Int. Cl.
| | |
|---|---|
| *H01M 4/36* | (2006.01) |
| *H01M 4/13* | (2010.01) |
| *H01M 4/62* | (2006.01) |
| *H01M 10/052* | (2010.01) |
| *H01M 4/587* | (2010.01) |
| *H01M 10/0525* | (2010.01) |
| *H01M 4/48* | (2010.01) |

(52) U.S. Cl.
CPC ............. *H01M 4/366* (2013.01); *H01M 4/13* (2013.01); *H01M 4/364* (2013.01); *H01M 4/483* (2013.01); *H01M 4/587* (2013.01); *H01M 4/62* (2013.01); *H01M 4/622* (2013.01); *H01M 4/623* (2013.01); *H01M 10/052* (2013.01); *H01M 10/0525* (2013.01)

(58) Field of Classification Search
CPC ...... H01M 4/366; H01M 4/364; H01M 4/483; H01M 4/587; H01M 4/62; H01M 4/622; H01M 4/623; H01M 4/13; H01M 10/052; H01M 10/0525
See application file for complete search history.

(56) References Cited

U.S. PATENT DOCUMENTS

2014/0127576 A1  5/2014  Kato et al.

FOREIGN PATENT DOCUMENTS

| JP | 2007-242590 A | 9/2007 |
| JP | 2010-287505 | * 12/2010 |
| JP | 2010-287505 A | 12/2010 |
| JP | 2011-054324 A | 3/2011 |
| WO | 2013/018486 A1 | 2/2013 |

OTHER PUBLICATIONS

Translation of Written Opinion dated Apr. 15, 2014, issued in counterpart International Application No. PCT/JP2014/000692 (5 pages).
International Search Report dated Apr. 15, 2014, issued in counterpart application No. PCT/JP2014/000692 (1 page).

* cited by examiner

*Primary Examiner* — Laura Weiner
(74) *Attorney, Agent, or Firm* — Westerman, Hattori, Daniels & Adrian, LLP

(57) ABSTRACT

It is an object to improve the initial charge-discharge efficiency of a nonaqueous electrolyte secondary battery that uses, as negative electrode active materials, a carbon material and a metal or metal oxide that forms an alloy with lithium. There is provided a nonaqueous electrolyte secondary battery including a positive electrode, a nonaqueous electrolyte, and a negative electrode which includes, as negative electrode active materials, a carbon material and a metal or metal oxide that forms an alloy with lithium and in which at least part of a surface of the carbon material is coated with a polymer material that does not react with lithium. The mass percentage of the polymer material that does not react with lithium relative to the carbon material is preferably 0.5 to 2 mass %.

7 Claims, No Drawings

NEGATIVE ELECTRODE FOR NONAQUEOUS ELECTROLYTE SECONDARY BATTERY AND NONAQUEOUS ELECTROLYTE SECONDARY BATTERY

TECHNICAL FIELD

The present invention relates to a negative electrode for nonaqueous electrolyte secondary batteries and a nonaqueous electrolyte secondary battery.

BACKGROUND ART

In order to increase the energy density and output of lithium-ion batteries, a study on using, as a negative electrode active material, a metal material that forms an alloy with lithium, such as silicon, germanium, tin, or zinc or an oxide of the foregoing metal instead of a carbon material such as graphite has been conducted.

In such a negative electrode active material composed of a metal material that forms an alloy with lithium or an oxide of the foregoing metal, lithium from a positive electrode active material is taken into the negative electrode active material during the first charge, but the lithium is not completely taken out during the discharge. An indefinite amount of lithium is immobilized in the negative electrode active material, which results in irreversible capacity. PTL 1 discloses that lithium is supplied to a negative electrode to compensate for the irreversible capacity of silicon oxide.

CITATION LIST

Patent Literature

PTL 1: Japanese Published Unexamined Patent Application No. 2007-242590

SUMMARY OF INVENTION

Technical Problem

However, the compensation for the irreversible capacity of silicon oxide cannot be sufficiently achieved in the nonaqueous electrolyte secondary battery of PTL 1 that uses silicon oxide and graphite in a negative electrode.

Solution to Problem

In view of the foregoing, a negative electrode for a nonaqueous electrolyte secondary battery according to the present invention includes a carbon material and a metal or metal oxide that forms an alloy with lithium. At least part of a surface of the carbon material is coated with a polymer material that does not react with lithium.

A nonaqueous electrolyte secondary battery according to the present invention includes the negative electrode, a positive electrode, and a nonaqueous electrolyte.

Advantageous Effects of Invention

According to the nonaqueous electrolyte secondary battery of the present invention, the initial charge-discharge efficiency can be improved.

DESCRIPTION OF EMBODIMENTS

Hereafter, embodiments of the present invention will be described in detail.

In this Description, the meaning of "substantially **" is that, when "substantially the same" is taken as an example, "substantially the same" is intended to include not only "exactly the same", but also "virtually the same".

A nonaqueous electrolyte secondary battery according to an embodiment of the present invention includes a positive electrode containing a positive electrode active material, a negative electrode containing a negative electrode active material, an organic material layer disposed between the positive electrode and the negative electrode, and a nonaqueous electrolyte containing a nonaqueous solvent. A separator is suitably disposed between the positive electrode and the negative electrode. For example, the nonaqueous electrolyte secondary battery has a structure in which an electrode body obtained by winding a positive electrode and a negative electrode with a separator disposed therebetween and a nonaqueous electrolyte are accommodated in an exterior body.

[Positive Electrode]

The positive electrode suitably includes a positive electrode current collector and a positive electrode active material layer formed on the positive electrode current collector. The positive electrode current collector is composed of, for example, a conductive thin film such as a metal foil or alloy foil of aluminum or the like which is stable in the potential range of a positive electrode or a film including a metal surface layer composed of aluminum or the like. The positive electrode active material layer preferably contains a conductive material and a binding agent, in addition to the positive electrode active material.

The positive electrode active material is not particularly limited, but is preferably a lithium transition metal oxide. The lithium transition metal oxide may contain a non-transition metal element such as Mg or Al. Specific examples of the lithium transition metal oxide include lithium cobaltate, olivine lithium phosphate such as lithium iron phosphate, and lithium transition metal oxides such as Ni—Co—Mn, Ni—Mn—Al, and Ni—Co—Al. These positive electrode active materials may be used alone or in combination of two or more.

The conductive material may be a carbon material such as carbon black, acetylene black, Ketjenblack, or graphite or a mixture of two or more of the foregoing. The binding agent may be polytetrafluoroethylene, polyvinylidene fluoride, polyvinyl acetate, polyacrylonitrile, or polyvinyl alcohol or a mixture of two or more of the foregoing.

[Negative Electrode]

A negative electrode suitably includes a negative electrode current collector and a negative electrode active material layer formed on the negative electrode current collector. The negative electrode current collector is composed of, for example, a conductive thin film such as a metal foil or alloy foil of copper or the like which is stable in the potential range of a negative electrode or a film including a metal surface layer composed of copper or the like. The negative electrode active material layer suitably includes a binding agent in addition to the negative electrode active material. The binding agent may be polytetrafluoroethylene or the like as in the case of the positive electrode, but is preferably styrene-butadiene rubber (SBR), polyimide, or the like. The binding agent may be used together with a thickener such as carboxymethyl cellulose.

The negative electrode active material includes a carbon material, at least part of a surface of which is coated with a polymer material that does not react with lithium and a metal or metal oxide that forms an alloy with lithium. The phrase "at least part of a surface of the carbon material is coated with a polymer material that does not react with lithium" also includes the case where a polymer material that does not react with lithium is adsorbed onto a surface of the carbon material.

The polymer material that does not react with lithium is not limited as long as the polymer material has ion permeability and does not react with lithium. Examples of the polymer material that does not react with lithium include starch derivatives having a basic structure of $C_6H_{10}O_5$, such as starch acetate, starch phosphate, carboxymethyl starch, and hydroxyalkyl starches, e.g., hydroxyethyl starch; viscous polysaccharides having a basic structure of $C_6H_{10}O_5$, such as pullulan and dextrin; water-soluble cellulose derivatives having a basic structure of $C_6H_{10}O_5$, such as carboxymethyl cellulose, methyl cellulose, hydroxyethyl cellulose, and hydroxypropyl cellulose; and water-soluble acrylic resin, water-soluble epoxy resin, water-soluble polyester resin, water-soluble polyamide resin, vinylidene fluoride/hexafluoropropylene copolymers, and polyvinylidene fluoride. Among them, water-soluble cellulose derivatives having a basic structure of $C_6H_{10}O_5$, such as carboxymethyl cellulose, methyl cellulose, hydroxyethyl cellulose, and hydroxypropyl cellulose are preferred because of their high electrochemical stability.

The mass percentage of the polymer material that does not react with lithium relative to the carbon material is preferably 0.1 to 3 mass % and more preferably 0.5 to 2 mass %. If the mass percentage is excessively decreased, the supply of lithium to the carbon material is facilitated, but the supply of lithium to the metal or metal oxide that forms an alloy with lithium tends to be inhibited. If the mass percentage is excessively increased, the conductivity on the surface of the carbon material and the amount of lithium ions occluded in the carbon material tend to be decreased.

At least part of the surface of the metal or metal oxide that forms an alloy with lithium may be coated with a polymer material that does not react with lithium. The ratio B/A of the mass percentage (B) of the polymer material that does not react with lithium relative to the metal or metal oxide that forms an alloy with lithium to the mass percentage (A) of the polymer material that does not react with lithium relative to the carbon material is less than 1, preferably 0.5 or less, more preferably 0.1 or less, and more preferably 0. As the ratio B/A decreases, the supply of lithium to the metal or metal oxide that forms an alloy with lithium tends to sufficiently proceed.

The mass ratio of the carbon material including the polymer material that does not react with lithium and the metal or metal oxide that forms an alloy with lithium is preferably 99:1 to 50:50 and more preferably 97:3 to 80:20. When the mass ratio is within the above range, both an increase in capacity and an improvement in initial charge-discharge characteristics can be easily achieved.

The carbon material is, for example, hard carbon, graphite, or a mixture of two or more of the foregoing.

The metal or metal oxide that forms an alloy with lithium is, for example, silicon, silicon oxide ($SiO_x$, $0 < x \leq 1.5$), tin, or germanium.

[Nonaqueous Electrolyte]

The nonaqueous electrolyte contains a nonaqueous solvent and an electrolyte salt dissolved in the nonaqueous solvent. The nonaqueous electrolyte is not limited to a liquid electrolyte (nonaqueous electrolytic solution), and may be a solid electrolyte that uses a gel polymer or the like. The nonaqueous solvent may be, for example, an ester, an ether, a nitrile (e.g., acetonitrile), or an amide (e.g., dimethylformamide) or a mixed solvent containing two or more of the foregoing.

Examples of the ester include cyclic carbonates such as ethylene carbonate (EC), propylene carbonate, and butylene carbonate; chain carbonates such as dimethyl carbonate, methyl ethyl carbonate, diethyl carbonate (DEC), methyl propyl carbonate, ethyl propyl carbonate, and methyl isopropyl carbonate; and carboxylates such as methyl acetate, ethyl acetate, propyl acetate, methyl propionate, ethyl propionate, and γ-butyrolactone.

Examples of the ether include cyclic ethers such as 1,3-dioxolane, tetrahydrofuran, 2-methyltetrahydrofuran, propylene oxide, 1,2-butylene oxide, 1,3-dioxane, furan, and 1,8-cineole; and chain ethers such as 1,2-dimethoxyethane, ethyl vinyl ether, ethyl phenyl ether, 1,2-diethoxyethane, 1,2-dibutoxyethane, diethylene glycol dimethyl ether, 1,1-dimethoxymethane, 1,1-diethoxyethane, and triethylene glycol dimethyl ether.

Among the solvents listed above, at least a cyclic carbonate is preferably used as the nonaqueous solvent, and both a cyclic carbonate and a chain carbonate are more preferably used. The nonaqueous solvent may also be a halogen substitution product obtained by substituting hydrogen atoms of a solvent with halogen atoms such as fluorine atoms.

The electrolyte salt is preferably a lithium salt. Examples of the lithium salt include $LiPF_6$, $LiBF_4$, $LiAsF_6$, $LiN(SO_2CF_3)_2$, $LiN(SO_2CF_5)_2$, and $LiPF_{6-x}(C_nF_{2n+1})_x$ ($1<x<6$, n: 1 or 2). These lithium salts may be used alone or in combination of two or more. The concentration of the lithium salt is preferably 0.8 to 1.8 mol per 1 L of the nonaqueous solvent.

[Separator]

A porous sheet having ion permeability and an insulating property is used as the separator. Specific examples of the porous sheet include microporous membranes, woven fabrics, and nonwoven fabrics. The separator is suitably made of a polyolefin such as polyethylene or polypropylene.

[Supply of Lithium to Negative Electrode]

The supply of lithium to the negative electrode (lithium pre-doping) is performed by, for example, a method for supplying lithium before battery assembly. The method for supplying lithium to the negative electrode before battery assembly includes, for example, uniformly forming a lithium metal film on a negative electrode by a lithium vacuum deposition method (evaporating a lithium source by resistance heating) and leaving it to stand in an environment of 10° C. to 120° C. at a dew point of −20° C. Examples of the lithium metal film include films formed by depositing lithium or attaching lithium and films containing lithium particles.

In a nonaqueous electrolyte secondary battery in which lithium is supplied in advance in an amount equal to or larger than the amount corresponding to the irreversible capacity resulting from the immobilization of lithium in the negative electrode active material, when the SOC of the nonaqueous electrolyte secondary battery is 0%, the lithium content in a portion of the negative electrode that does not face the positive electrode is equal to or higher than the lithium content in a portion of the negative electrode that faces the positive electrode. The SOC (state of charge) indicates a state of charge based on the assumption that the charge capacity at full charge is 100%. When the SOC of a nonaqueous electrolyte secondary battery is 0%, the state is a fully discharged state. The lithium content can be measured by ICP or the like.

In a nonaqueous electrolyte secondary battery in which lithium is supplied in advance in an amount smaller than the amount corresponding to the irreversible capacity resulting from the immobilization of lithium in the negative electrode active material, when the SOC of the nonaqueous electrolyte secondary battery is 0%, the lithium content in a portion of the negative electrode that does not face the positive electrode is higher than 0 and lower than the lithium ion content in a portion of the negative electrode that faces the positive electrode.

In a nonaqueous electrolyte secondary battery that uses a negative electrode to which lithium is not supplied, when the SOC is 0%, lithium in an amount corresponding to the irreversible capacity is left in a portion of the negative electrode that faces the positive electrode, and the lithium content in a portion of the negative electrode that does not face the positive electrode is substantially zero.

The appropriate amount of lithium supplied is dependent on the size of the irreversible capacity of a negative electrode active material layer used, and is thus suitably adjusted.

EXAMPLES

The present invention will be further described based on Examples, but is not limited to these Examples.

Example 1

Production of Positive Electrode

Lithium cobaltate, acetylene black, and polyvinylidene fluoride were mixed at a mass ratio of 100:1.5:1.5 together with an appropriate amount of N-methylpyrrolidone using a mixer to prepare a positive electrode mixture slurry. The positive electrode mixture slurry was applied onto both surfaces of a positive electrode current collector sheet having a thickness of 15 μm and composed of an Al foil, dried, and rolled. Then, the sheet was cut into a size corresponding to that of a battery case made of a desired laminate material. Thus, a positive electrode used in a lithium-ion battery of Experimental Example 1 was produced. The packing density of the positive electrode active material layer was 3.8 g/mL.

[Coating of Graphite]

A certain amount of carboxymethyl cellulose sodium (#1380 manufactured by Daicel FineChem Ltd.) was dissolved by being added to 1 L of pure water. Into the solution, 1 kg of artificial graphite powder (average particle size ($D_{50}$): 25 μm) was charged, and then stirring was performed using a homogenizer for 60 minutes to disperse the artificial graphite powder. The resulting dispersion liquid was dried at 100° C. using a spray dryer to obtain a dry graphite powder.

[Measurement of Mass Percentage]

The amount of wear loss by heat was calculated from the following formula using the weight ($W_1$) of the dry graphite powder and the weight ($W_2$) of graphite obtained by heat-treating the dry graphite powder in the air at 400° C. for 2 hours. The amount of wear loss by heat was defined as a coating amount for graphite.

Coating amount [wt %]=$[(W_1-W_2)/W_1]\times 100$

The coating amount of carboxymethyl cellulose for graphite was 1.0 mass %.

[Production of Negative Electrode]

The obtained graphite powder, SiO particles coated with a conductive carbon material and having an average particle size ($D_{50}$) of 6 μm, carboxymethyl cellulose (#1380 manufactured by Daicel FineChem Ltd.), and styrene-butadiene rubber were mixed at a mass ratio of 90:10:1:1 together with an appropriate amount of water using a mixer to prepare a negative electrode mixture slurry. The negative electrode mixture slurry was applied onto both surfaces of a negative electrode current collector sheet having a thickness of 10 μm and composed of a copper foil, dried, and rolled. The packing density of the negative electrode active material layer was 1.60 g/mL.

[Supply of Lithium to Negative Electrode]

Metallic lithium was formed on both surfaces of the negative electrode by a vacuum deposition method so as to have a thickness of 4.0 μm, and left to stand in a vacuum at 60° C. for 6 hours to supply lithium to the negative electrode.

[Preparation of Nonaqueous Electrolytic Solution]

$LiPF_6$ was added to a nonaqueous solvent prepared by mixing EC and DEC at a ratio of EC:DEC=3:7 (volume ratio) so that the concentration of $LiPF_6$ was 1.0 mol/L. Two parts by mass of FEC was added to the resulting electrolytic solution to prepare a nonaqueous electrolytic solution.

[Production of Battery C1]

A tab was attached to each of the electrodes. A wound electrode body was produced by winding the positive electrode and the negative electrode in a spiral manner with the separator disposed therebetween so that the tabs were located in outermost peripheral portions. The electrode body was inserted into an exterior body composed of an aluminum laminate sheet and vacuum-dried at 105° C. for 2 hours. Subsequently, the nonaqueous electrolytic solution was injected. The opening of the exterior body was sealed to produce a battery C1. The design capacity of the battery C1 was 800 mAh.

Example 2

A battery C2 was produced in the same manner as in Example 1, except that the mass percentage of carboxymethyl cellulose sodium relative to graphite was changed to 0.5 mass %.

Example 3

A battery C3 was produced in the same manner as in Example 1, except that the mass percentage of carboxymethyl cellulose sodium relative to graphite was changed to 2.0 mass %.

Example 4

A battery C4 was produced in the same manner as in Example 1, except that carboxymethyl cellulose ammonium (DN400 manufactured by Daicel FineChem Ltd.) was used instead of the carboxymethyl cellulose sodium.

Comparative Example 1

A battery R1 was produced in the same manner as in Example 1, except that the graphite was not coated with the carboxymethyl cellulose sodium.

<Evaluation of Battery Performance>

The batteries C1 to C4 and R1 were evaluated in terms of initial charge-discharge efficiency. Table 1 shows the evaluation results.

[Initial Charge-Discharge Efficiency]

(1) Charge: Constant current charge was performed at a current of 0.5 It until the voltage reached 4.3 V. Subsequently, constant voltage charge was performed at a voltage of 4.3 V until the current reached 0.05 It.

(2) Discharge: Constant current discharge was performed at a current of 0.2 It until the voltage reached 3.0 V.

The percentage of the first-cycle discharge capacity relative to the first-cycle charge capacity was defined as an initial charge-discharge efficiency.

Initial charge-discharge efficiency (%)=(First-cycle discharge capacity/First-cycle charge capacity)×100

In the batteries C1 to C4, lithium was supplied to the negative electrode so that, when the SOC was 0% (after initial charge and discharge), the lithium content in a portion of the negative electrode that does not face the positive electrode was equal to or higher than the lithium content in a portion of the negative electrode that faces the positive electrode.

TABLE 1

| Battery | Polymer material that coats graphite | Mass percentage of polymer material relative to graphite (mass %) | Initial charge-discharge efficiency (%) |
|---|---|---|---|
| C1 | Carboxymethyl cellulose sodium | 1.0 | 90 |
| C2 | Carboxymethyl cellulose sodium | 0.5 | 89 |
| C3 | Carboxymethyl cellulose sodium | 2.0 | 90 |
| C4 | Carboxymethyl cellulose ammonium | 1.0 | 90 |
| R1 | — | — | 85 |

As is clear from Table 1, the initial charge-discharge efficiency of the nonaqueous electrolyte secondary battery that uses, as negative electrode active materials, SiO and graphite coated with a polymer material that does not react with lithium is improved. This is because the supply of lithium from a lithium film formed on the negative electrode to SiO in the negative electrode is caused to selectively proceed by using the graphite coated with a polymer material that does not react with lithium instead of graphite in the negative electrode.

The invention claimed is:

1. A negative electrode for a nonaqueous electrolyte secondary battery, comprising a carbon material and a metal or metal oxide that forms an alloy with lithium,
wherein at least part of a surface of the carbon material is coated with a polymer material that does not react with lithium; and
wherein a ratio B/A of the mass percentage (B) of the polymer material that does not react with lithium relative to the metal or metal oxide that forms an alloy with lithium to the mass percentage (A) of the polymer material that does not react with lithium relative to the carbon material is less than 0.5 or less.

2. The negative electrode for a nonaqueous electrolyte secondary battery according to claim 1,
wherein a mass percentage of the polymer material that does not react with lithium to the carbon material is 0.5 to 2 mass %.

3. The negative electrode for a nonaqueous electrolyte secondary battery according to claim 1,
wherein the polymer material that does not react with lithium is at least one selected from the group consisting of a starch derivative having a $C_6H_{10}O_5$ structure, a viscous polysaccharide having a $C_6H_{10}O_5$ structure, a water-soluble cellulose derivative having a $C_6H_{10}O_5$ structure, a water-soluble acrylic resin, a water-soluble epoxy resin, a water-soluble polyester resin, a water-soluble polyamide resin, a vinylidene fluoride/hexafluoropropylene copolymer, and polyvinylidene fluoride.

4. A nonaqueous electrolyte secondary battery comprising the negative electrode according to claim 1, a positive electrode, and a nonaqueous electrolyte.

5. The nonaqueous electrolyte secondary battery according to claim 4,
wherein when a state of charge of the nonaqueous electrolyte secondary battery based on an assumption that a charge capacity at full charge is 100% is 0%, a lithium content in a portion of the negative electrode that does not face the positive electrode is equal to or higher than a lithium content in a portion of the negative electrode that faces the positive electrode.

6. The negative electrode for a nonaqueous electrolyte secondary battery according to claim 1,
wherein the ratio of B/A is 0.1 or less.

7. The negative electrode for a nonaqueous electrolyte secondary battery according to claim 6,
wherein the ratio of B/A is zero.

* * * * *